United States Patent
Han et al.

(10) Patent No.: US 7,127,012 B2
(45) Date of Patent: Oct. 24, 2006

(54) APPARATUS AND METHOD FOR SEPARATING CARRIER OF MULTICARRIER WIRELESS COMMUNICATION RECEIVER SYSTEM

(75) Inventors: Kyungtae Han, Taejon (KR); In-Gi Lim, Taejon (KR); Ik-Soo Eo, Taejon (KR); Hye-Ju Seo, Taejon (KR); Kyung-Soo Kim, Taejon (KR); Hee-Bum Jung, Taejon (KR); Han-Jin Cho, Taejon (KR)

(73) Assignees: Electronics and Telecommunications Research Institute(KR); MTEKVision Co., Ltd.(KR)

( * ) Notice: Subject to any disclaimer, the term of this patent is extended or adjusted under 35 U.S.C. 154(b) by 1022 days.

(21) Appl. No.: 09/963,297

(22) Filed: Sep. 25, 2001

(65) Prior Publication Data
US 2002/0145970 A1    Oct. 10, 2002

(30) Foreign Application Priority Data
Dec. 26, 2000    (KR) ............................... 2000-82253

(51) Int. Cl.
*H04B 7/10*    (2006.01)
*H04B 1/707*   (2006.01)

(52) U.S. Cl. .................................................. 375/347

(58) Field of Classification Search ............... None
See application file for complete search history.

(56) References Cited

U.S. PATENT DOCUMENTS

| 6,078,796 | A  |   | 6/2000  | Ling |
|-----------|----|---|---------|------|
| 6,327,311 | B1 | * | 12/2001 | Ojard .......................... 375/261 |
| 6,690,735 | B1 | * | 2/2004  | Maddiotto et al. .......... 375/260 |
| 6,876,645 | B1 | * | 4/2005  | Guey et al. ................. 370/342 |
| 6,925,067 | B1 | * | 8/2005  | Jou ............................. 370/329 |

FOREIGN PATENT DOCUMENTS

| KR | 96-12805    | 9/1996 |
| KR | 1997-055573 | 7/1997 |
| KR | 298062707   | 7/2000 |

* cited by examiner

*Primary Examiner*—Kevin Kim
(74) *Attorney, Agent, or Firm*—Blakely Sokoloff Taylor & Zafman

(57) ABSTRACT

In the apparatus and method for separating carrier of multicarrier wireless communication receiver system, each carrier separation is performed after a quantization in a wireless communication receiver system such as a received multicarrier CDMA (Code Division Multiple Access) etc., to thereby reduce the whole number of quantizers and separate multicarrier from a received signal. For that, the apparatus for separating the carrier of the multicarrier wireless communication receiver system includes an internal oscillating unit for generating internal multicarrier; a plurality of frequency transition units for respectively down-converting the multicarrier generated by the internal oscillating unit and moving it to frequency of "0" as a frequency center; and a plurality of filtering units for individually filtering the respective carrier moved by the plurality of frequency transition units to the frequency center as the frequency of "0", through a low frequency pass band and for providing it as an input of a rake receiver.

13 Claims, 7 Drawing Sheets

APPARATUS AND METHOD FOR SEPARATING CARRIER OF MULTICARRIER WIRELESS COMMUNICATION RECEIVER SYSTEM

FIELD OF THE INVENTION

The present invention relates to an apparatus and method for separating each carrier in a wireless communication receiver system such as a received multicarrier code division multiple access (CDMA) etc.; and more particularly, to an apparatus and method for performing a separation for each carrier of a multicarrier wireless communication receiver system after a quantization in a wireless communication receiver system, to thereby reduce the whole number of quantizers.

PRIOR ART OF THE INVENTION

In general, in, a 1X receiver a CDMA signal received through an antenna was passed through a radio frequency (RF) process block and was down-converted to a base band, and this signal was passed through a low frequency band filter to reduce a signal outside the band, and the received carrier signal was used as an input of a rake receiver.

However, in a case of a 3X for loading and sending respective information from a transmitting terminal to three carriers, an apparatus capable of separating three carriers is required in a receiving terminal.

This is why the CDMA receiver generally quantizes a signal in an input of the rake receiver. Thus, since in the case of 3X, the input number of the rake receiver becomes thrice, a quantized analog digital converter (ADC) also requires thrice the 1X receiver.

Accordingly, it is indispensably required a method of lessening the number of the ADCs.

SUMMARY OF THE INVENTION

Therefore, it is an object of the present invention to provide an apparatus and method for separating carrier of multicarrier wireless communication receiver system, in which a separation of each carrier is performed after a quantization in a wireless communication receiver system such as a received multicarrier code division multiple access (CDMA) etc., to thereby reduce the whole number of quantizers.

To achieve these and other advantages, and in accordance with the purpose of the present invention, the carrier processing apparatus for separating multicarrier from a received signal in a multicarrier wireless communication receiver system includes an internal oscillating unit for generating internal multicarrier; a plurality of frequency transition units for respectively down-converting the multicarrier generated by the internal oscillating unit and moving it to frequency of "0" as a frequency center; and a plurality of filtering units for individually filtering the respective carrier moved by the plurality of frequency transition units to the frequency center as the frequency of "0", through a low frequency pass band, and for providing it as an input of a rake receiver.

Further, in accordance with the present invention, in the method of separating carrier in a receiver of 3X, each carrier separation is performed after a quantization, and in order to separate the carrier in the 3X receiver and gain information from the carrier, one carrier uses intact the existing 1X method, and the down-conversion is performed one more when its neighboring rest two carriers are separated, to thus move its values to a center thereof and perform the separation.

In addition, in order to get information from the carrier by separating three carriers in the invention, it is characterized that the number of down-conversions for three carriers becomes same, to thereby move the values to the center and perform the separation.

Embodying an IMT-2000 synchronous-type MC 3X receiver of the invention is to separate a multicarrier signal gotten by binding three carriers and sending it. This makes each carrier, frequency down-converted, and makes the carrier separated by using each low frequency band filter, and this signal is used as an input of a rake receiver.

A CDMA reception system generally quantizes a signal in the input of the rake receiver. In a case of 3X, since the input number of the rake receiver becomes thrice, a quantizing ADC is also required thrice the 1X receiver. In the invention it is disclosed to perform the quantization before separating the carrier in the method for lessening the number of the ADCs.

Thus, the carrier separation is executed after the quantization, to whereby reduce the whole number of quantizers.

Like this, the invention is for the apparatus for separating each carrier in the received multicarrier CDMA receiver system, and is composed of an internal oscillator for generating an internal carrier signal, a multiplier for moving a multicarrier signal to a frequency center, and a low frequency band pass FIR filter for eliminating other carrier signal.

Herewith, the internal oscillator includes a constant containing an increase value of each generation carrier, an accumulator for accumulating values, a reset for initializing the value when a value of the accumulator exceeds a constant value, a multiplexer and round for multiplexing three signals and rounding it off, a lookup table having a storage of a sine value, and a demultiplexer for separating the multiplexed signal.

The FIR filter is composed of an input shift register and selector for performing a single bit for 6 bit input as a complement of 2 and storing it, an address generator for generating an address of a lookup table, a six-divided lookup table and calculator, and an accumulator for right-shifting and code-extending a filter output of the generated respective bits and for accumulating them.

In the inventive internal oscillator, there are merits to embody this oscillator by digital instead of analog, commonly use the lookup table having the storage of the sine signal, and lessen an area of a hardware by simplifying a control signal. Further, the inventive FIR filter has a merit of reducing the number of gates about 50% in comparison with a transversal filter using a multiplier based on a conventional technique, by using a minimized lookup table instead of the multiplier. In case that the multicarrier separation is executed through such method, it can be realized a miniaturization and a low price of an application specific integrated circuit (ASIC), and there also is an effect of lessening a consumption of electric power through a high integration, therefore this method can be usefully utilized for a mobile station.

Describing the invention more in detail, in order to separate carrier in a receiver of 3X and gain information from the carrier, like "10" of FIG. 2 one carrier uses intact the existing 1X method, and when its neighboring rest two carriers are separated, a down-conversion is performed one more, to thus move the values to the center and execute the separation. In such method the separation method for three carriers is different from the process of the first carrier, a magnitude of respective signals becomes different. That is, the invention was proposed under the purpose of efficiently extracting a signal of carrier by equally processing the carrier signals like "20" of FIG. 2.

In the inventive FIR filter having a multibit filter input, a multiplier great in a use quantity of hardware is not used in designing the FIR filter, but a system of the lookup table appropriate to a small quantity of the hardware and a high speed computation is applied to the design of the FIR filter. For that, the 6 bit filter input as a complement type of 2 is separated and converted into six single-bits, and 64 tap filter coefficient is 8-divided, and a symmetry within respective lookup tables is used to minimize a size of an overall lookup table. Accordingly, a design technique of a new filter for processing the 64 tap FIR filter computation of the 6 bit input is proposed herein.

In the inventive multicarrier separating apparatus, the carrier separation is performed after the quantization, to whereby reduce the whole number of quantizers.

The inventive internal oscillator has the structure of multiplexing a signal gained through each of the constant, the accumulator and the reset in order to generate each carrier signal, and of rounding it off, and thus, of producing an oscillation signal by using one lookup table. Also, when a value of the accumulator exceeds a constant value, the reset for initializing the value is simplified, to thereby reduce an area of the hardware.

In addition, the inventive FIR filter has the structure that the 6 bit input as a complement type of 2 is converted into six single-bits, a several single-bits input FIR filter computation is processed in one independent filter, and these are accumulated in bit units of the six number, to thereby output a filter output value of the 6 bit input finally. Further, in the construction of the filter the multiplier is not used, but a symmetry inverted for only a code value provided within the lookup table is used to embody a smaller size than the existing lookup table use quantity. Whereby a size of the FIR filter embodiment hardware and a consumption of electricity can be minimized in comparison with the conventional general filter design system.

BRIEF DESCRIPTION OF THE DRAWINGS

The above and other objects and features of the instant invention will become apparent from the following description of preferred embodiments taken in conjunction with the accompanying drawings, in which.

PREFERRED EMBODIMENT OF THE INVENTION

Hereinafter, preferred embodiments of the present invention will be described in detail with reference to the accompanying drawings.

Figure 1:
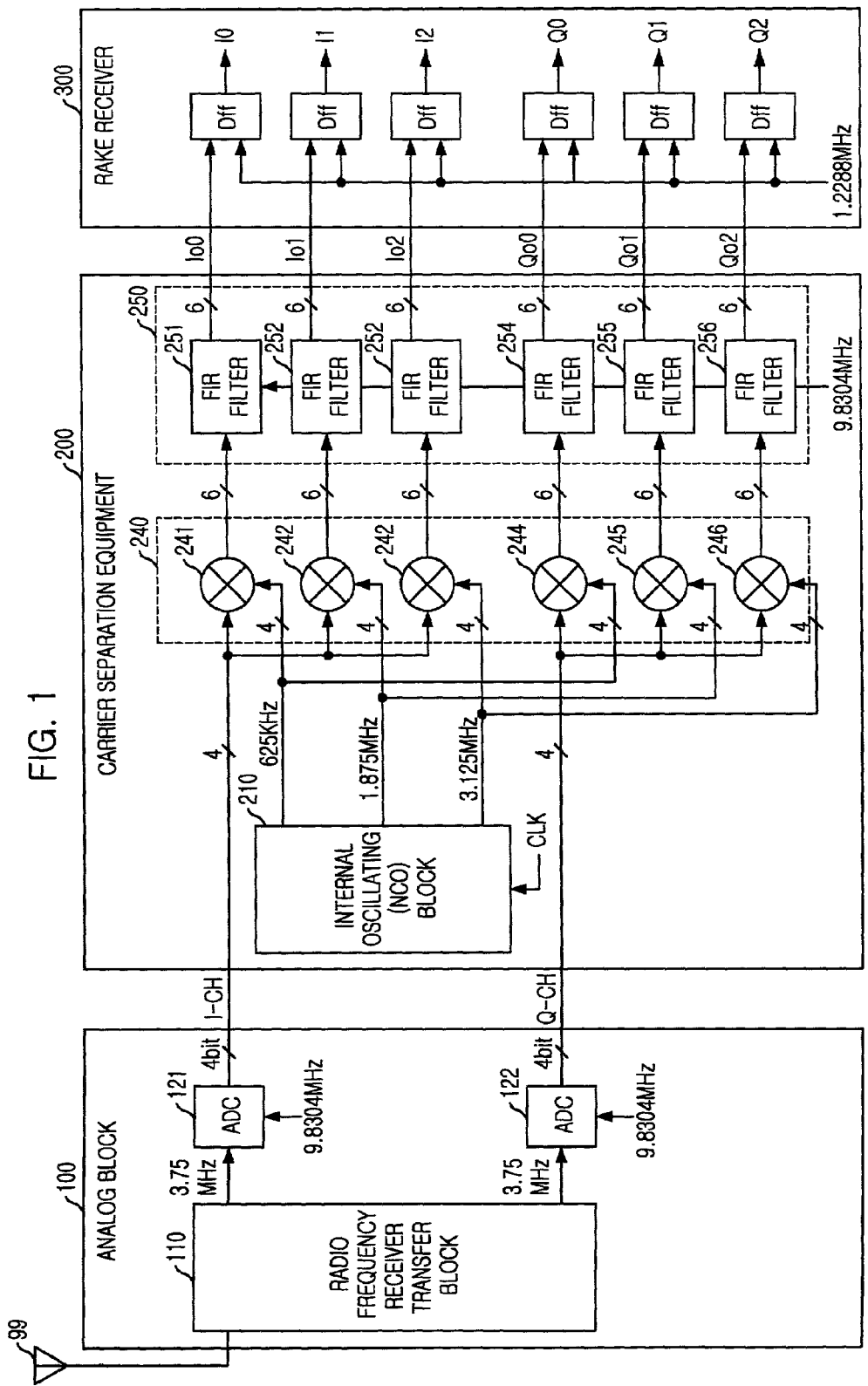
FIG. 1 is a constructive exemplary diagram of a CDMA receiver system interlocked with a digital carrier separation apparatus in accordance with the present invention.

FIG. 1 is a constructive exemplary diagram of a CDMA receiver system interlocked with a digital carrier separation apparatus in accordance with the present invention. In FIG. 1, "99" represents a reception antenna, "100" an analog block (ANALOG ASIC), "110" a radio frequency (RF) receiver front-end block, "121, 122" an analog/digital converter (ADC) block, "200" a carrier separation equipment as a channel separation block (MC Processor), "210" an internal oscillating (NCO) block, "240", a multiplier block, "241~246" multipliers, "250" a low frequency (LF) band pass filter (FIR filter) block, "251~256" FIR filters, and "300" a rake receiver, respectively.

As shown in FIG. 1, in order to separate multicarrier from a received signal, the inventive carrier separation equipment as the channel separation block (MC processor) 200 includes an internal oscillating (NCO) block 210 for generating internal multicarrier; a multiplier block 240 for respectively down-converting the multicarrier generated by the internal oscillating block 210 and moving it to frequency of "0" as a frequency center; and a low frequency (LF) band pass filter block 240 for individually filtering the respective carrier moved by the multiplier block 240 to the frequency center as the frequency of "0", through a low frequency pass band, for deleting unnecessary band information, and for providing only itself carrier information as an input of the rake receiver 300.

The analog block (ANALOG ASIC) 100 lowers a signal received through the reception antenna 99 to a base band and converts it into a digital signal. At this time, the conversion of the digital signal is performed in the ADC 121, 122 of the analog block 100, and since a band width of its input signal is 3.75 MHz, its sampling should be executed by frequency more twice thereof.

In the invention, analog signals of I channel and Q channel are sampled in 4 bit output of 9.8304 MHz by using two ADCs 121, 122. A signal of two ADCs 121, 122 occupies a band like "20" of FIG. 2. To separate carrier, the carrier is moved to frequency of "0" by using multipliers 21, 22, 23, and other signals are eliminated by using the low frequency (LF) band pass filter block 250.

Figure 2:
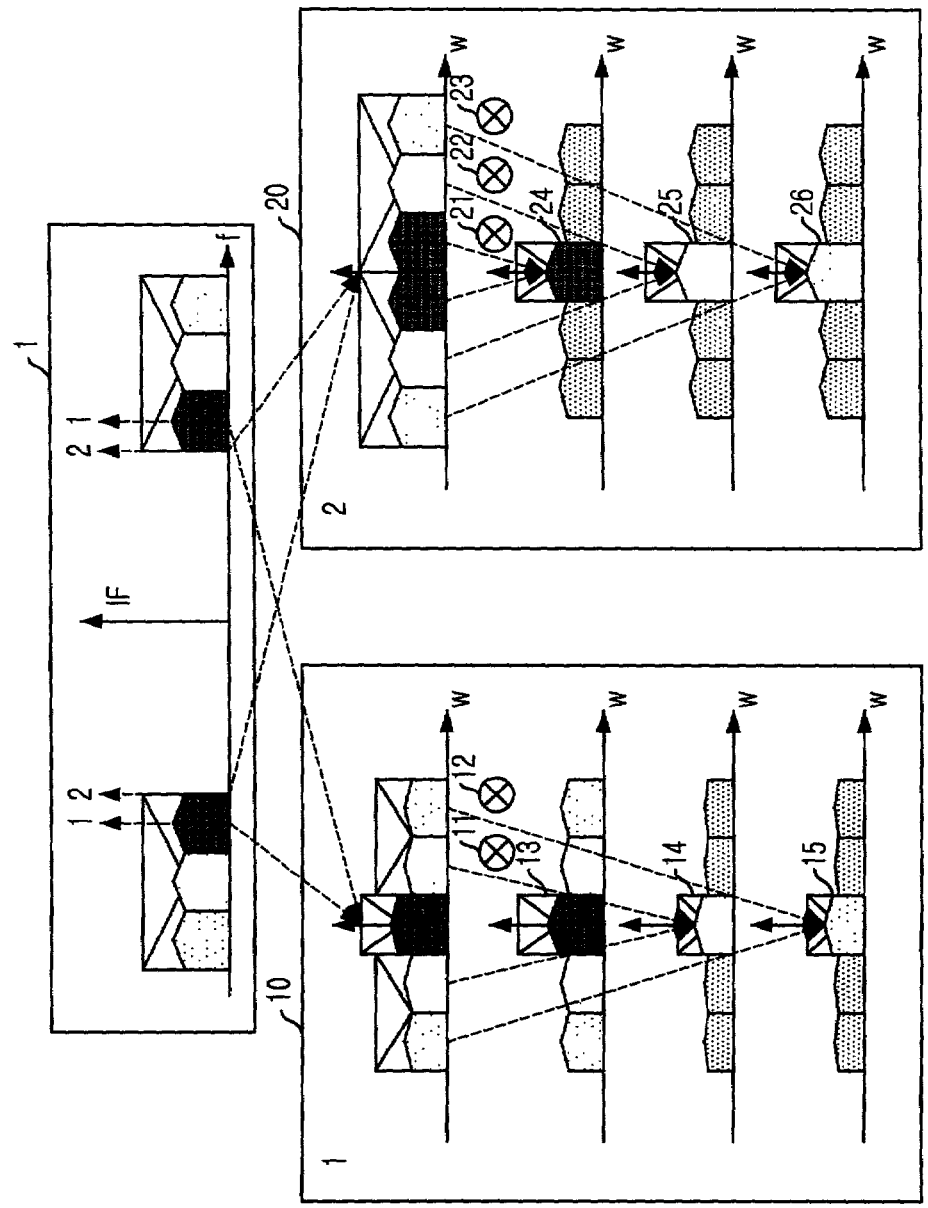
FIG. 2 depicts an explanation diagram for one embodiment of a carrier separating method in the present invention.

In order to separate carrier in a receiver of 3X and gain information, like "10" of FIG. 2 one carrier uses intact the existing 1X method, and when its neighboring rest two carriers are separated, a down-conversion is performed one more, to thus move the values to the center thereof and execute the separation. In such method the separation method for three carriers is different from the process of the first carrier, a magnitude of respective signals becomes different. That is, in the present invention, a signal of carrier can be efficiently extracted by equally processing the carrier signal like "20" of FIG. 2. This is described in detail, as follows.

To move first carrier frequency to "0", frequency of 625 KHz generated in the internal oscillating (NCO) block 210 is moved to frequency of 0 through a signal sampled by the I channel ADC 121 and the multiplier 210, and is moved to frequency of 0 through a signal sampled by the Q channel ADC 122 and the multiplier 244.

Further, in order to move second carrier frequency to "0", frequency of 1.875 MHz generated in the internal oscillating (NCO) block 210 is moved to the frequency of 0 through the signal sampled by the I channel ADC 121 and the multiplier 242, and is moved to the frequency of 0 through the signal sampled by the Q channel ADC 122 and the multiplier 245.

In addition, in order to move third carrier frequency to "0", frequency of 3.125 MHz generated in the internal oscillating (NCO) block 210 is moved to the frequency of 0 through the signal sampled by the I channel ADC 121 and the multiplier 243, and is moved to the frequency of 0 through the signal sampled by the Q channel ADC 122 and the multiplier 246.

Information loaded on the carrier moved to the frequency of 0 through the $0^{th}$ multiplier 241 of the I channel deletes information of an unnecessary band through the low frequency band pass filter 251, to thus send only itself carrier information as a $0^{th}$ signal of the I channel of the rake receiver 300.

Information loaded on the carrier moved to the frequency of 0 through the 1st multiplier 242 of the I channel deletes the information of the unnecessary band through the low frequency band pass filter 252, to thus send only itself carrier information as a 1st signal of the I channel of the rake receiver 300.

Information loaded on the carrier moved to the frequency of 0 through the 2nd multiplier 243 of the I channel deletes the information of the unnecessary band through the low frequency band pass filter 253, to thus send only itself carrier information as a 2nd signal of the I channel of the rake receiver 300.

Information loaded on the carrier moved to the frequency of 0 through the $0^{th}$ multiplier 244 of the Q channel deletes the information of the unnecessary band through the low frequency band pass filter 254, to thus send only itself carrier information as a $0^{th}$ signal of the Q channel of the rake receiver 300.

Information loaded on the carrier moved to the frequency of 0 through the 1st multiplier 245 of the Q channel deletes the information of the unnecessary band through the low frequency band pass filter 255, to thus send only itself carrier information as a 1st signal of the Q channel of the rake receiver 300.

Information loaded on the carrier moved to the frequency of 0 through the 2nd multiplier 246 of the Q channel deletes the information of the unnecessary band through the low frequency band pass filter 256, to thus send only itself carrier information as a 2nd signal of the Q channel of the rake receiver 300.

4 bit signal sampled in the multiplier block (namely, the multipliers 241~246) 240 and 4 bit signal generated in the internal oscillating (NCO) block 210 are multiplied, and then upper 6 bit is inputted to the low frequency band pass filter block (namely, the FIR filter 251~256) 250.

Figure 3:
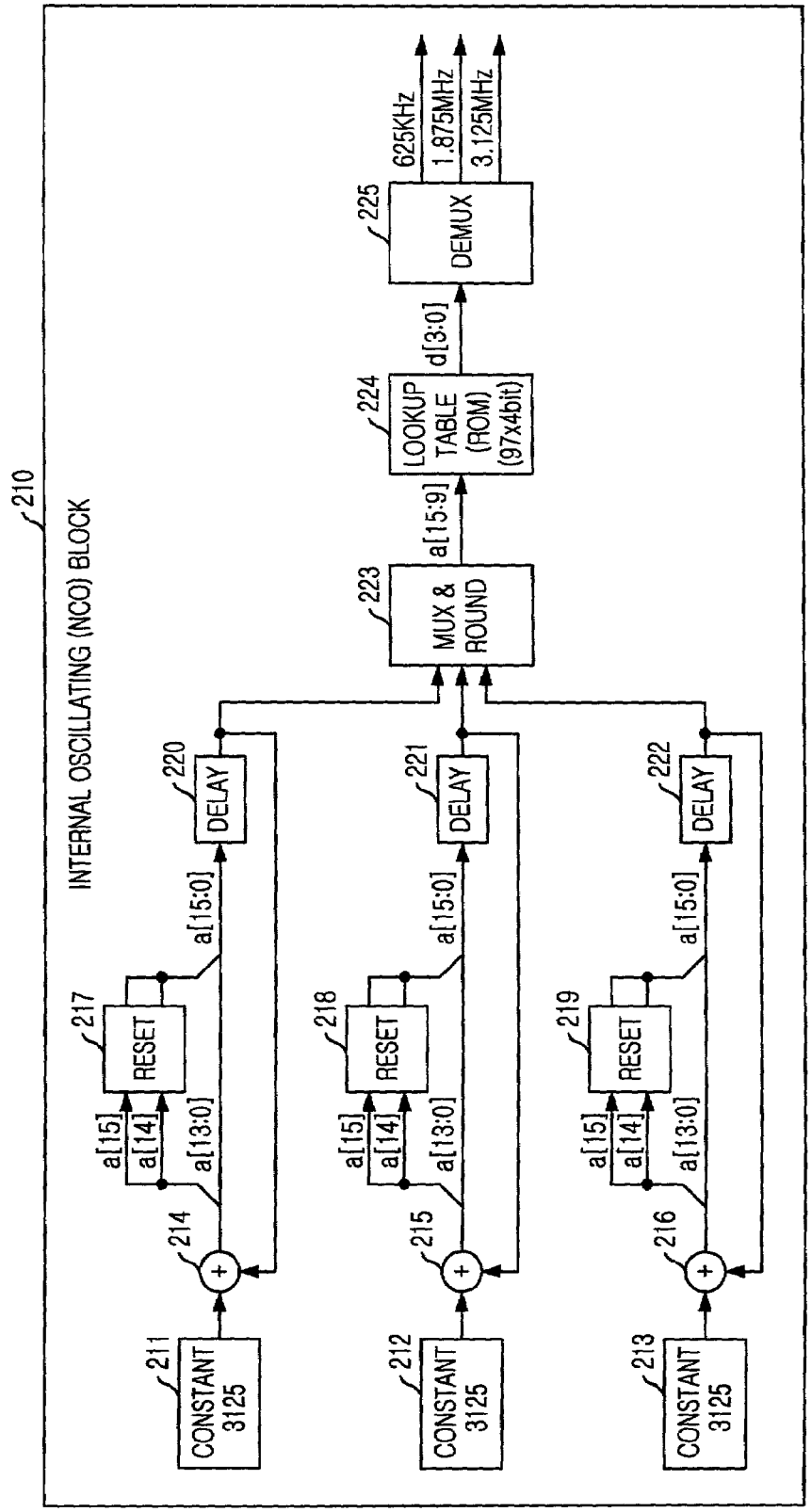
FIG. 3 illustrates a detailed block diagram in one embodiment of an internal oscillating (NCO) block shown in FIG. 1 in the invention.

FIG. 3 is a detailed block diagram in one embodiment of the internal oscillating (NCO) block shown in FIG. 1 in the invention. In the drawing, "211~213," indicate constants, "214~216" accumulators, "217~219" resets, "220~222" delays, "223" a multiplexer and round (Mux & Round), "224" a lookup table (ROM), and "225" a demultiplexer (Demux), respectively.

As shown in FIG. 3, the internal oscillating (NCO) block 210 includes the constants 211~213 containing increase values 3125, 9375, 15625; the accumulators 214~216 for accumulating constant values of the constants 211~213 every clock; the resets 217~219 for initializing a value when the value of the accumulator exceeds one cycle of sine wave; the delay 220~222 for keeping the values of the accumulators 214~216 and returning the values to the accumulators 214~216 when resetting; the multiplexer and round 223 for multiplexing output values of the delays 220~222 and rounding the values off; the lookup table 224 having a storage of the sine value, for outputting the sine value corresponding to each carrier with an address of the value rounded off; and the demultiplexer 225 for demultiplexing the sine value and outputting an sine signal of each carrier frequency as an oscillating signal.

Herewith, the multiplexer 223 and the demultiplexer 225 are not necessary if three of the lookup tables 224 are used.

The internal oscillating (NCO) block 210 is used for making three sine wave.

Output sine wave frequency is 625 KHz, 1.875 MHz and 3.125 MHz when input clock frequency is 9.8304 MHz.

A constant value of '3215' is added with the accumulator 214 every clock in the first constant 211, and is kept in the delay 220. At this time, when the value of the accumulator 214 becomes greater than 49152(=1100000000000000) representing one cycle of the sine wave, it becomes initialized by the reset 217, to thus serve as a role that the value of the delay 220 is wrapped.

A constant value of '9375' is added with the accumulator 215 every clock in the second constant 212, and is kept in the delay 221. At this time, when the value of the accumulator 215 becomes greater than 49152(=1100000000000000) representing one cycle of the sine wave, it becomes initialized by the reset 218, to thus serve as a role that the value of the delay 221 is wrapped.

A constant value of '15625' is added with the accumulator 216 every clock in the third constant 213, and is kept in the delay 222. At this time, when the value of the accumulator 216 becomes greater than 49152(=1100000000000000) representing one cycle of the sine wave, it becomes initialized by the reset 219, to thus serve as a role that the value of the delay 222 is wrapped.

After that, output values of the delays 220~222 are passed through the multiplexer and round 223 to be multiplexed in timing, and are rounded off to upper 7 bit. At this time, the upper 7 bit becomes an address of the lookup table 224, to output a sine value of 4 bit corresponding to each carrier to the demultiplexer 225. Then, the demultiplexer 225 demultiplexes the sine value in timing, and outputs a sine signal of 625 KHz, 1.875 MHz, and 3.125 Mhz as each carrier frequency.

The address of the lookup table 224 requires 4×96 having 96 of addresses to satisfy an output allowance error of 4 bit, but, in order to prepare for the rounding-off, a 4×97 lookup table, into which a value equal to a $0^{th}$ address is entered a $97^{th}$ address, is used.

Figure 4:
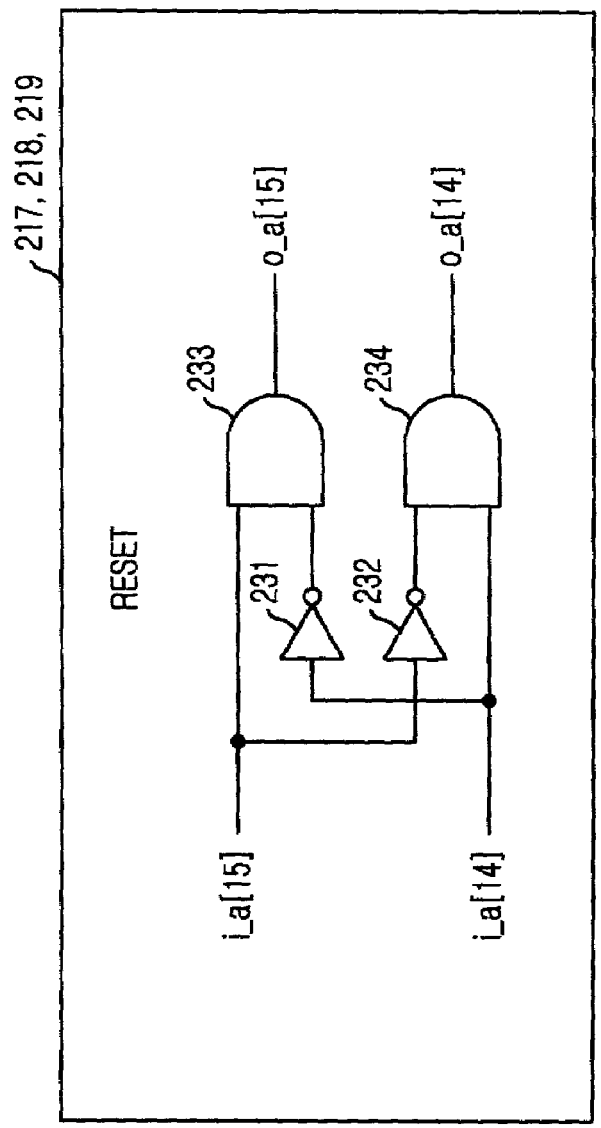
FIG. 4 is a detailed constructive diagram in one embodiment of a reset shown in FIG. 3 in the invention.

FIG. 4 is a detailed constructive diagram in one embodiment of the reset shown in FIG. 3 in the invention, and in the drawing, "231,232", represents an NOT gate and "233,234" indicates an AND gate individually.

The resets 217~219 serve as a role that values of the delays 220~222 are wrapped, when the values of the accumulators 214~216 exceed boundary values. Herewith, the used boundary value representing 2 pi corresponds to 49152 (=1100000000000000) which is a case that all of two upper bits are 11.

In an operation of the resets RST 217~219, only in case that the upper two bits are '11', its bit is made '00' and the rest is outputted as it is. To embody that, as shown in FIG. 4, it can be made by a composition of the NOT gates 231,232 and the AND gates 233,234. An operation of an output on the basis of the input is as the following table 1.

TABLE 1

| Input | | Output | |
|---|---|---|---|
| 0 | 0 | 0 | 0 |
| 0 | 1 | 0 | 1 |
| 1 | 0 | 1 | 0 |
| 1 | 1 | 0 | 0 |

The low frequency band pass (FIR) filter is described in detail, as follows.

A 6 bit input as a complement type of 2 is converted into six single bits, and several single bits input FIR filter computation is processed in one independent filter, and these are accumulated in bit units of the 6 number, to thus get the structure of finally outputting a filter output value of 6 bit input.

Figure 5A:
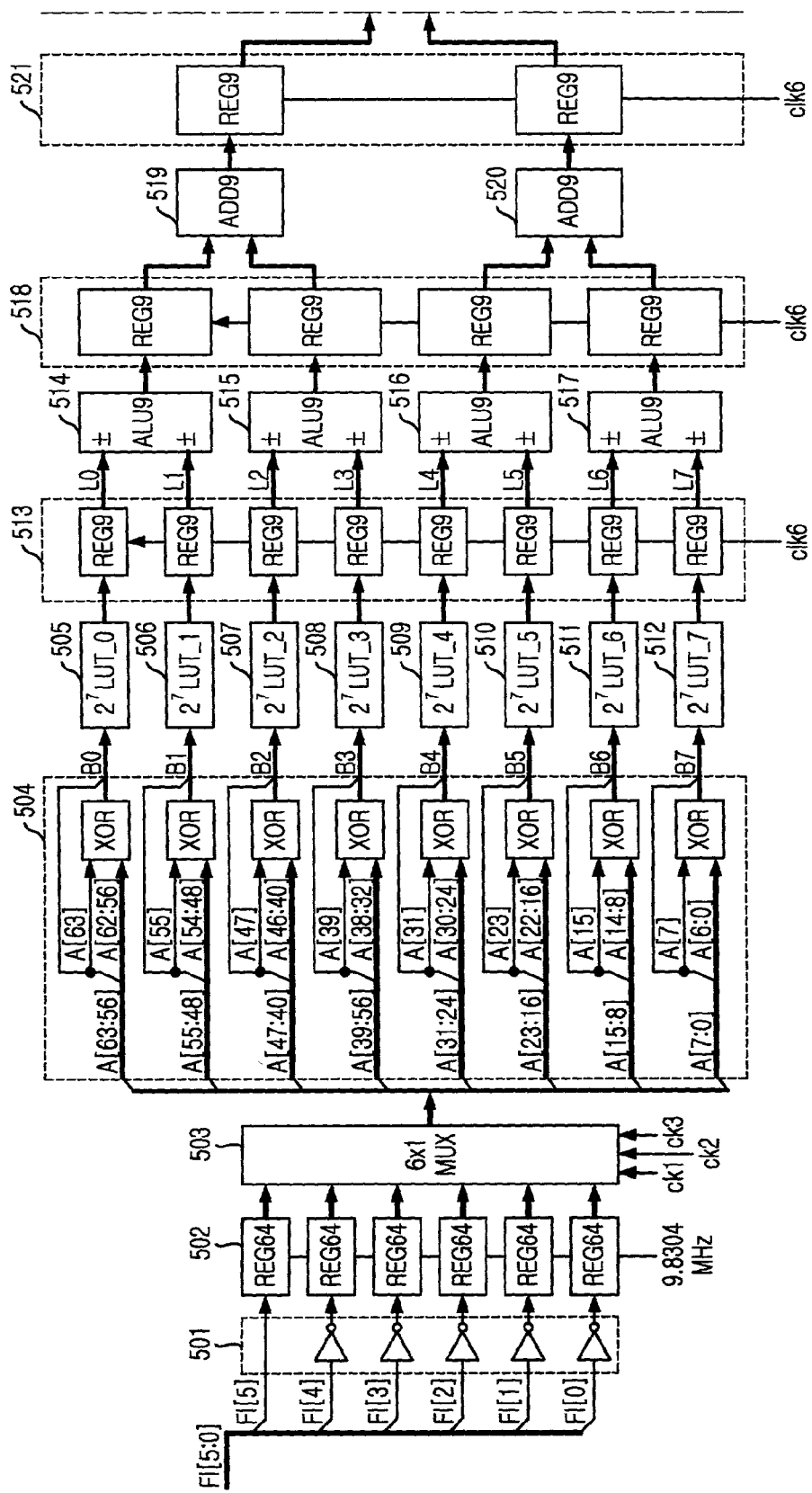
FIGS. 5A and 5B show a constructive diagram in one embodiment of a low frequency band pass filter (FIR filter) shown in FIG. 1 in the invention.
Figure 5B:
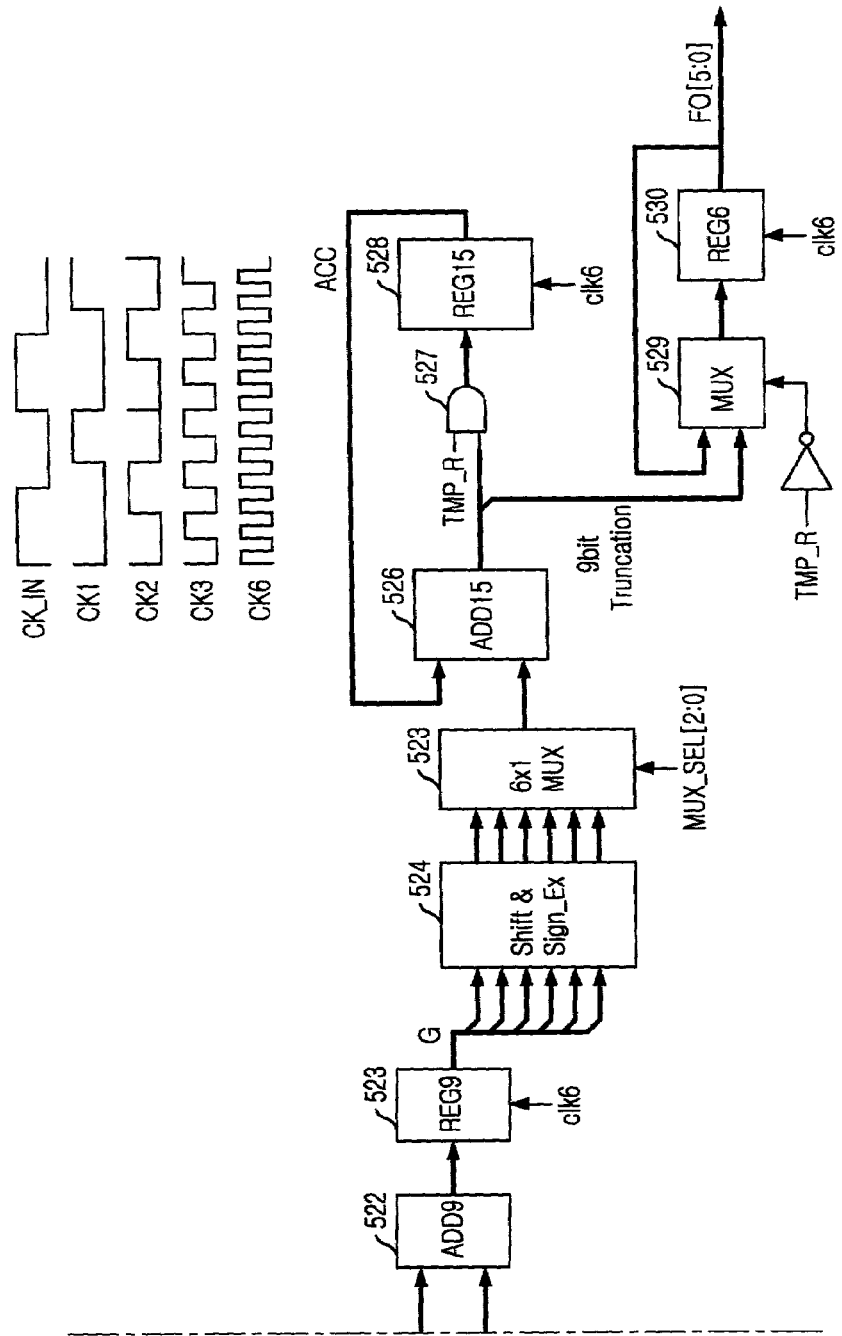

FIGS. 5A and 5B show a constructive diagram in one embodiment of a low frequency band pass filter (FIR filter) shown in FIG. 1 in the invention, and in the drawing, "501" represents an NOT gate block as a filter input converter, "502" an SREG64 as a 64 bit shift register, "503" 6×1 MUX (64 bit 6×1 multiplexer)(selector), "504" an XOR gate as an address generator, "505", 2^7 LUT_0 (128 of lookup tables for A[63:56]), "506" 2^7 LUT_1 (128 of lookup tables for A[55:48]), "507" 2^7 LUT_2 (128 of lookup tables for A[47:40]), "508" 2^7 LUT_3 (128 of lookup tables for A[39:32]), "509" 2^7 LUT_4 (128 of lookup tables for A[31:24]), "510" 2^7 LUT_5 (128 of lookup tables for A[23:16]), "511" 2^7 LUT_6 (128 of lookup tables for A[15:8]), "512" 2^7 LUT_7 (128 of lookup tables for A[7:0]), "513,518,521,523" REG9 as a 9 bit register, "514~517" an ALU9 as a 9 bit arithmetic logic unit, "519, 520,522" an ADD9 as a 9 bit adder, "523" a shift & sign Ex, "525" a 6×1 MUX, "526" an ADD15 as a 15 bit adder, "527" an AND gate, "528" a REG15 as a 15 bit register, "529" a 2×1 MUX, and "530" REG9 as a 9 bit register, respectively.

As shown in FIGS. 5A and 5B, the low frequency band pass filter (FIR filter) is composed of a filter input converter (NOT gate) 501, six input shift registers (SREG64) 502 and a selector (6×1 MUX) 503, an address generator (XOR gate) 504, eight lookup tables (2^7 LUT_n) 505~512, an ALU outputs of eight lookup tables 505~512, a computation block constructed by ADD, and an accumulator for right-shifting, by the input bit number, results outputted per each filter input bit and accumulating them.

FI[5:0] as 6 bit filter input of a complement type of 2 which is inputted to a clock of CK_IN, has 64 cases of maximum '011111'(+31) and minimum '100000'(−32).

In the FIR filter input, '0' should be inputted as '+1' and '1' should be inputted '−1', in an antipodal bit shape, therefore, in the filter input converter 501, FI[5] as MSB is inputted intact, and the filter input converter 501 serves as a role of inverting FI[4], FI[3], FI[2], FI[1] and FI[0]. Thus, '011111' as the maximum value of the filter input is converted into '000000', and this has a value of +63. Further the minimum value '1100000' is converted into '111111' and has a value of −63.

Describing six input shift registers 502 and the selector 503, six of single bit inputs converted in the antipodal bit shape by the filter input converter 501 are inputted to each SREG64 502 by CH_IN. At this time, the stored values of the shift register 502 are sequentially selected by the 6×1 MUX 503 which is controlled by CK1, CK2 and CK3, to generate A[63:0].

In order for an access to an address of an omitted lookup table by using a symmetry within the lookup table, the address generator 504 is constructed by XOR gates for performing an exclusive logical sum XOR by using a most significant bit (MSB) of an inputted address. An output B0[7:0] of the address generator 504 is the address for 2^7 LUT_0, and is as,

B0[7]=A[63],

B0[6]=A[63]⊕A[62],

B0[5]=A[63]⊕A[61],

B0[4]=A[63]⊕A[60],

B0[3]=A[63]⊕A[59],

B0[2]=A[63]⊕A[58],

B0[1]=A[63]⊕A[57], and

B0[0]=A[63]⊕A[56],

Herewith, 7 bit of B0[6:0] is inputted as the address for 2^7 LUT_0, and the most significant bit B0[7] is delayed by CK6 and is used for a code inversion control of L0 which is an input of the ALU9 514. In the same method, B1[7:0] is generated, and 7 bit of B1[6:0] is the address for 2^7 LUT_1, and the most significant bit B1[7] is delayed by CK6 and is used for a code inversion control of L1 which is another input of the ALU9 514.

The inventive 64 tap filter coefficient is divided into eight to reduce the whole number of the lookup tables, and coefficients charged by each lookup table are as follows.

LUT_0={C0, C1, C2, C3, C4, C5, C6, C7} (8 coefficients)

LUT_1={C8, C9, C10, C11, C12, C13, C14, C15} (8 coefficients)

LUT_2={C16, C17, C18, C19, C20, C21, C22, C23} (8 coefficients)

LUT_3={C24, C25, C26, C27, C28, C29, C30, C31} (8 coefficients)

LUT_4={C32, C33, C34, C35, C36, C37, C38, C39} (8 coefficients)

LUT_5={C40, C41, C42, C43, C44, C45, C46, C47} (8 coefficients)

LUT_6={C48, C49, C50, C51, C52, C53, C54, C55} (8 coefficients)

LUT_7={C56, C57, C58, C59, C60, C61, C62, C63} (8 coefficients)

A symmetry within the lookup table will be described by using a case of LUT_0 coefficient.

LUT_0 is composed of eight coefficients as C0, C1, C2, C3, C4, C5, C6 and C7. When +Cn is gotten in case that 0 is entered as the input and −Cn is gotten in case that 1 is entered as the input, values of the lookup table like the following [Table 2] are provided according to a state of 256 sorts of input 8 bit.

TABLE 2

| Address | Lookup table output value |
|---|---|
| 00000001 | + C0 + C1 + C2 + C3 + C4 + C5 |
| — | — |
| 11111110 | − C0 − C1 − C2 − C3 − C4 − C5 |
| 11111111 | − C0 − C1 − C2 − C3 − C4 − C5 |

Herewith, a first value and a final value are opposite in only its code, and their sizes have the same value. In other words, the 128 number of front values and the 128 number of back values among 256 lookup tables values are just opposite in only the code and are symmetrical with the same value. Therefore, the number of the lookup tables of LUT_0 is embodied as 2^7 not the 2^8 number, and in case the most significant bit of the input bit is '0', the lookup table value is outputted as it is, and in a case of '1', a code is inverted and is outputted to reduce the number of the lookup tables to a half thereof.

Eight REG9's 513 are 9 bit registers for a pipeline operating by CK6, and store a result of the lookup table.

If B0[7]'='0' and B1[7]'='0', ALU9(514) output=L0+L1
If B0[7]'='0' and B1[7]'='1', ALU9(514) output=L0−L1
If B0[7]'='1' and B1[7]'='0', ALU9(514) output=L0+L1
If B0[7]'='1' and B1[7]'='1', ALU9(514) output=L0−L1

Herewith, B0[7]' and B1[7]' represent signals that B0[7] and B1[7] are delayed by 1 clock by CK6.

In the same method, other three outputs of the ALU9 are generated, and their results are stored at four REG9's 518. The stored values are added up by each two values through two 9 bit adders 519,520, and are again stored at two REG9's 521, and these are again added up by the 9 bit adder 522, and are finally stored at the REG9 523.

In the shift & sign Ex 524, a right-shift and a code extension are performed as a computation for providing a weight value of a filter output to be processed, together with a conversion of a filter input of 6 bit into six single bits. A summary for an output of the shift & sign Ex 701 corresponding to each filter input is as follows.

Filter output corresponding to FI[5]: S, G[8:0], "00000"
Filter output corresponding to FI[4]: S,S, G[8:0], "0000"
Filter output corresponding to FI[3]: S,S,S, G[8:0], "000"
Filter output corresponding to FI[2]: S,S,S,S, G[8:0], "00"
Filter output corresponding to FI[1]: S,S,S,S,S, G[8:0], "0"
Filter output corresponding to FI[0]: S,S,S,S,S,S, G[8:0]

Herewith, S represents a value of G[8] as a code value of G[8:0], and one code extension on the most significant bit for the filter output corresponding to FI[5] is utilized for the purpose of preventing an overflow occurring in the ADD15 526 of a back end. Six inputs right-shifted, code-extended and generated are selected by a 6×1 MUX 525 controlled by MUX_SEL[2:0]. The REG15 528 stored by the ADD15 (526) and CK6 forms the accumulator. The AND gate 527 is used for the purpose of resetting the REG15 (528) by ACC_R signal. Further, 2×1 MUX (529) and REG6 (530) are used for the purpose of storing a value accumulated by a repetition of the 6 number, and perform 9 bit truncation with 6 bits as the output bit number.

Figure 6:
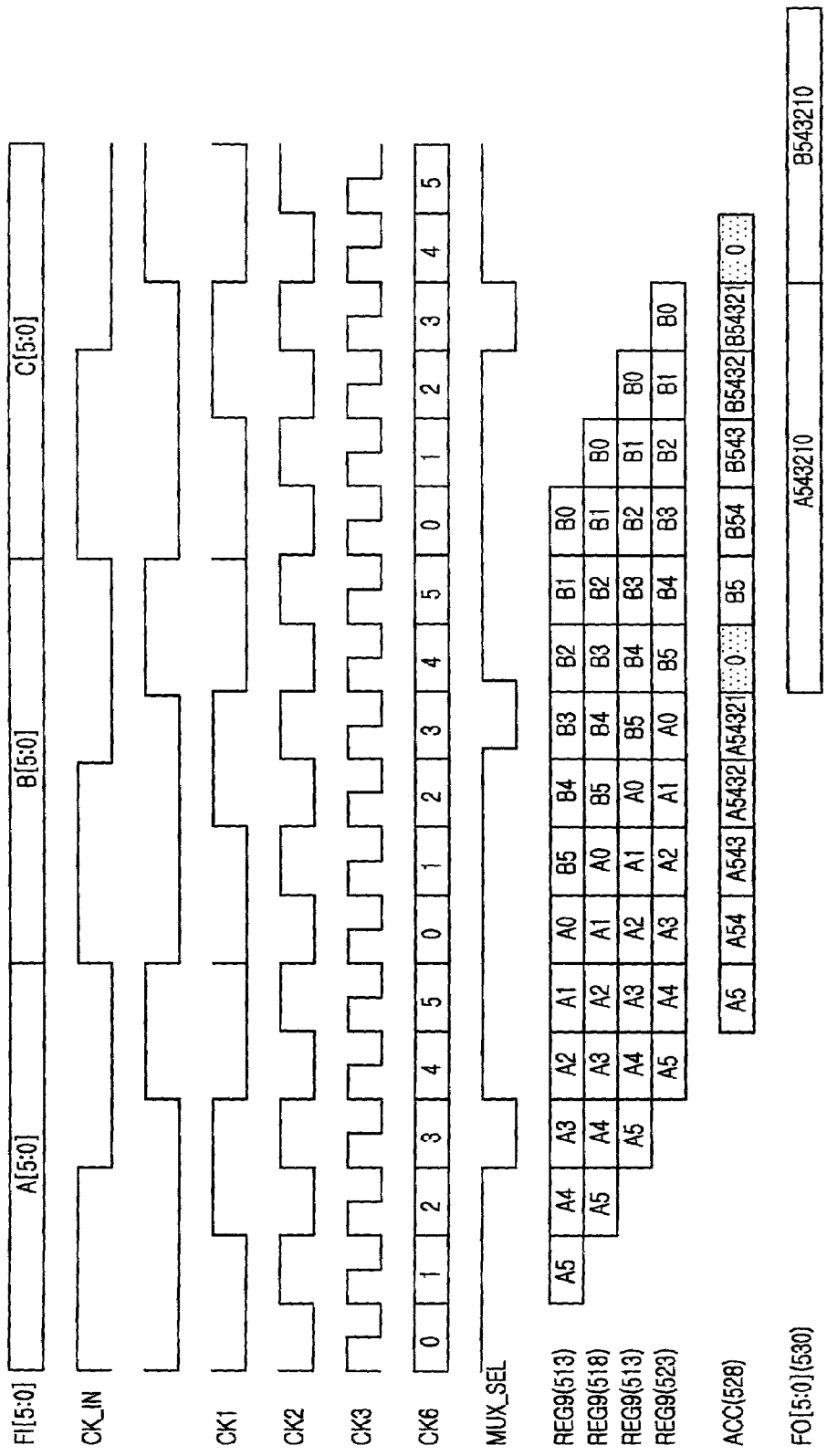
FIG. 6 provides a timing diagram for each part and an FIR filter use clock in the present invention.

Timing utilized in the inventive FIR filter is described referring to FIG. 6, as follows.

FI[5:0] as the filter input is inputted to a clock of CK_IN, and the whole filters are operated by CK6 which is the clock speeder by 6 times that that clock. A signal generation of CK3, CK2 and Ck1 is easily gained from a 3 bit counter driven by CK6. The ACC_R signal is generated as '0' in case that a value of MUX_SEL[2:0] is '3', and this is used as a reset control of REG15 (528) which constructs the accumulator, and is also used as a selection signal of 2×1 MUX 529.

The above description is based on one embodiment of the FIR filter in the invention, and is gotten under an assumption of 6 bit filter input and 6 bit filter output in the 64 tap FIR filter.

The inventive FIR filter is generalized and can be extended in its structure according that the tap number of filter is X bit filter input and Y bit filter output in an N tap FIR filter.

The inventive method as afore-mentioned can be realized as a program and can be stored at a record medium such as CDROM, RAM, ROM, a floppy disk, a hard disk, and an optical magnetic disk, etc. which are capable of being read through a computer.

As afore-mentioned, the present invention has the following effects.

In the inventive multicarrier separating apparatus, a carrier separation is performed after a quantization, to whereby reduce the whole number of quantizers.

Further, the inventive carrier separation is based on the method of making the frequency down-adjusting number equal, in other words, making frequency electricity of each carrier equal, to then control electricity of the carrier easily.

In addition, the inventive internal oscillator is embodied by a digital instead of an analog to reduce a loop error and construct a stable circuit, and commonly uses a lookup table having a storage of a sine signal and simplifies a control signal, to thus lessen an area of hardware.

Furthermore, the inventive FIR filter has such a structure that a FIR filter computation for several single bit inputs is processed in one independent filter by a lookup table without using a multiplier, and the computed results are accumulated in six of bit units, to finally output a filter output value of 6 bit. Such structure can minimize a size of embodiment hardware for the FIR filter and consumption of electricity in comparison with a general filter design system using a conventional multiplier.

Accordingly, the invention can realize a miniaturization of an ASIC for use of a signal demodulation and a price drop, and has an effect that the electricity consumption becomes reduced through high integration, which can be usefully utilized in a mobile station.

It will be apparent to those skilled in the art that various modifications and variations can be made in the present invention without deviating from the spirit or scope of the invention. Thus, it is intended that the present invention cover the modifications and variations of this invention provided they come within the scope of the appended claims and their equivalents.

What is claimed is:

1. An apparatus comprising:
   an internal oscillating unit for generating an internal multicarrier, said internal oscillating unit comprises:
   a constant containing an increase value of each generation carrier;
   an accumulator for accumulating constant values of the constant every clock;
   a reset for initializing the value when the value of the accumulator exceeds one cycle of sine wave;
   a plurality of delays for keeping the values of the accumulator and returning the values to the accumulator in resetting;
   a multiplexer and round for multiplexing an output value of the plurality of delays and rounding it off;
   a lookup table having a storage of a sine value, for outputting a sine value corresponding to each carrier with an address as the value rounded off by the multiplexer and round; and a demultiplexer for demultiplexing the sine value and outputting a sine signal of each carrier frequency as an oscillating signal;

a plurality of frequency transition units for respectively down-converting the internal multicarrier generated by the internal oscillating unit and moving it to frequency of "0" as a frequency center; and a plurality of filtering units for individually filtering a respective carrier moved by the plurality of frequency transition units to the frequency center as the frequency of "0", through a low frequency pass band and for providing the respective carrier as an input to a rake receiver, wherein the apparatus operates to separate carriers of a multicarrier wireless communication receiver system, and operates to separate carriers from a received external multicarrier signal.

2. The apparatus of claim 1, wherein said reset wraps the address of the lookup table having the storage of the sine signal as the sine wave by using only upper two bits.

3. The apparatus of claim 1, wherein said lookup table requires 4×96 having addresses of the 96 number to satisfy an output allowance error of 4 bit, but uses a 4×97 lookup table, into which a value equal to a $0^{th}$ address is entered a $97^{th}$ address, for the sake of a preparation of the rounding-off.

4. The apparatus of claim 1, wherein said internal oscillating unit comprises by a plural number:

constants containing the increase value of each generation carrier;

accumulators for accumulating the constant values of the constant every clock;

resets for initializing the value when the value of the accumulator exceeds a constant value, preferably, one cycle of the sine wave;

delays for keeping the values of the accumulator and returning the values to the accumulator in resetting;

rounds for rounding the output value of the delay off; and a plurality of lookup tables having the storage of the sine value, for outputting the sine value corresponding to each carrier with the address as the value rounded off by the round.

5. The apparatus of claim 4, wherein said reset wraps the address of the lookup table having the storage of the sine signal as the sine wave by using only upper two bits.

6. The apparatus of claim 4, wherein said lookup table requires 4×96 having addresses of the 96 number to satisfy an output allowance error of 4 bit, but uses a 4×97 lookup table, into which a value equal to a $0^{th}$ address is entered a $97^{th}$ address, for the sake of a preparation of the rounding-off.

7. The apparatus of claim 1, wherein said plurality of frequency transition units use six multipliers and make frequency electricity of each carrier same in order to make the frequency down-adjusting number equal, to thereby control electricity of the carrier easily.

8. The apparatus of claim 7, wherein said plurality of filtering units are a 64 tap low frequency band pass filter of a 6 bit filter input as an FIR filter for converting 6 bit input as a complement type of 2 into six single bits, processing a low frequency band pass filter (FIR filter) computation of several single bit inputs in one independent filter, and accumulating them in six of bit units, to finally output a filter output value of 6 bit input, even without using the multiplier.

9. The apparatus of claim 8, wherein said low frequency band pass (FIR) filter comprises:

six 64 bit shift registers for making 6 bit filter inputs as the complement type of 2, single bit, and shifting and storing them;

a selector for selecting one out of input data stored at six 64 bit shift registers;

an address generator for generating the address so as to be matched with the lookup table divided into the eight number by using input data selected in the selector;

a lookup table divided into the eight number with the address generated in the address generator, each lookup table being reduced in a size thereof by using a symmetry provided within the lookup table;

a computing part for computing outputs of eight lookup tables by a most significant bit (MSB) control of each lookup table address, adding up them, and thereby generating filter outputs corresponding to respective filter input bits; and an accumulator for right-shifting the filter output per bit and accumulating by the number of coefficients.

10. The apparatus of claim 9, wherein said address generator is constructed by exclusive logical sum (XOR) gates for performing an exclusive logical sum (XOR) computation by using a most significant bit (MSB) of an inputted address, in order for an access to an address of an omitted lookup table by using a symmetry within the lookup table.

11. An apparatus comprising:

an internal oscillating unit for generating an internal multicarrier, said internal oscillating unit comprises by a plural number:

constants containing the increase value of each generation carrier;

accumulators for accumulating the constant values of the constant every clock;

resets for initializing the value when the value of the accumulator exceeds a constant value, preferably, one cycle of the sine wave;

delays for keeping the values of the accumulator and returning the values to the accumulator in resetting;

rounds for rounding the output value of the delay off; and a plurality of lookup tables having the storage of the sine value, for outputting the sine value corresponding to each carrier with the address as the value rounded off by the round;

a plurality of frequency transition units for respectively down-converting the internal multicarrier generated by the internal oscillating unit and moving it to frequency of "0"as a frequency center; and a plurality of filtering units for individually filtering a respective carrier moved by the plurality of frequency transition units to the frequency center as the frequency of "0", through a low frequency pass band and for providing the respective carrier as an input to a rake receiver, wherein the apparatus operates to separate carriers of a multicarrier wireless communication receiver system, and operates to separate carriers from a received external multicarrier signal.

12. The apparatus of claim 11, wherein said reset wraps the address of the lookup table having the storage of the sine signal as the sine wave by using only upper two bits.

13. The apparatus of claim 11, wherein said lookup table requires 4×96 having addresses of the 96 number to satisfy an output allowance error of 4 bit, but uses a 4×97 lookup table, into which a value equal to a $0^{th}$ address is entered a $97^{th}$ address, for the sake of a preparation of the rounding-off.

* * * * *